United States Patent
Young et al.

(10) Patent No.: US 10,245,520 B2
(45) Date of Patent: Apr. 2, 2019

(54) POWERED RIDE-ON VEHICLE

(71) Applicant: RADIO FLYER INC., Chicago, IL (US)

(72) Inventors: Matthew E. Young, Chicago, IL (US); Benjamin P. Marggraf, Chicago, IL (US); Daniel R. Greenberg, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 15/728,984

(22) Filed: Oct. 10, 2017

(65) Prior Publication Data

US 2018/0099230 A1  Apr. 12, 2018

Related U.S. Application Data

(60) Provisional application No. 62/406,508, filed on Oct. 11, 2016, provisional application No. 62/520,297, filed on Jun. 15, 2017.

(51) Int. Cl.
*B62D 1/04* (2006.01)
*B60L 15/00* (2006.01)
(Continued)

(52) U.S. Cl.
CPC ............. *A63H 17/38* (2013.01); *A63H 29/22* (2013.01); *B60K 28/00* (2013.01); *B60L 15/2009* (2013.01); *B60L 15/2036* (2013.01); *B62D 1/04* (2013.01); *B62D 9/002* (2013.01); *G05D 1/0011* (2013.01); *B60L 2200/20* (2013.01); *B60L 2220/42* (2013.01); *B60L 2240/12* (2013.01);
(Continued)

(58) Field of Classification Search
CPC ..... A63H 17/395; B62D 11/003; B62D 11/04
See application file for complete search history.

(56) References Cited

U.S. PATENT DOCUMENTS

| | | | | |
|---|---|---|---|---|
| 5,609,220 A | * | 3/1997 | Moriya | .................... B62D 7/08 180/253 |
| 5,816,352 A | * | 10/1998 | Hacker | .................. A63G 25/00 180/167 |
| 6,095,267 A | | 8/2000 | Goodman | |
| 6,915,871 B2 | * | 7/2005 | Gavish | .................. A63G 25/00 180/167 |

(Continued)

OTHER PUBLICATIONS

International Search Report and Written Opinion dated Jan. 8, 2018 in PCT/US2017/056061 (15 pages).

*Primary Examiner* — Bryan A Evans
(74) *Attorney, Agent, or Firm* — Barnes and Thornburg LLP (57) ABSTRACT

A ride-on vehicle is provided that has drive and spin functionalities. The ride-on vehicle comprises a first motor for a first drive wheel, and a second motor for a second drive wheel. The vehicle has a steering wheel having a go selector and a spin selector. A sensor obtains an output of the angular rotation location of the steering wheel. A controller is electrically connected to the first and second motors, the go selector, the spin selector, and the steering wheel sensor, wherein engaging the go selector and turning the steering wheel causes the vehicle to move forward, left or right, depending on the angular location of the steering wheel, and wherein engaging the spin selector and turning the steering wheel causes the vehicle to spin left or spin right, depending on the angular location of the steering wheel. The vehicle may also be controlled remotely by a remote control.

25 Claims, 6 Drawing Sheets

(51) Int. Cl.
  *B62D 11/00*  (2006.01)
  *A63H 17/38*  (2006.01)
  *A63H 29/22*  (2006.01)
  *B60K 28/00*  (2006.01)
  *B60L 15/20*  (2006.01)
  *B62D 9/00*   (2006.01)
  *G05D 1/00*   (2006.01)

(52) U.S. Cl.
  CPC ....... *B60L 2240/24* (2013.01); *B60L 2240/42* (2013.01); *B60L 2240/421* (2013.01); *B60Y 2200/81* (2013.01); *G05D 2201/0214* (2013.01); *Y02T 10/645* (2013.01); *Y02T 10/646* (2013.01); *Y02T 10/72* (2013.01); *Y02T 10/7275* (2013.01)

(56) References Cited

U.S. PATENT DOCUMENTS

| | | | |
|---|---|---|---|
| 7,344,430 B2 * | 3/2008 | Hasty | A63H 17/395 |
| | | | 180/167 |
| 7,438,148 B1 | 10/2008 | Crea | |
| 7,553,211 B1 | 6/2009 | DeAngelis | |
| 8,558,487 B2 * | 10/2013 | Gabbie | H02K 7/14 |
| | | | 180/65.1 |
| 2003/0114270 A1 | 6/2003 | Wuertz et al. | |
| 2006/0254839 A1 | 11/2006 | Hasty et al. | |
| 2010/0206647 A1 | 8/2010 | Ishii et al. | |
| 2011/0012548 A1 * | 1/2011 | Wilcox | B60L 3/04 |
| | | | 318/468 |
| 2011/0127093 A1 * | 6/2011 | Koga | B62D 11/003 |
| | | | 180/6.24 |

\* cited by examiner

POWERED RIDE-ON VEHICLE

CROSS-REFERENCE TO RELATED APPLICATIONS

This application claims the benefit of U.S. Provisional Patent Application Nos. 62/406,508, filed Oct. 11, 2016 and 62/520,297, filed Jun. 15, 2017, both of which are expressly incorporated herein by reference and made a part hereof.

FEDERALLY SPONSORED RESEARCH OR DEVELOPMENT

Not Applicable.

TECHNICAL FIELD

The present disclosure generally relates to a powered vehicle, and in particular, to a battery-powered ride-on vehicle with standard drive and spin drive capabilities, and dual on-board drive and remote-control drive capabilities.

BACKGROUND

Ride-on vehicles, including multiple drive and remote-controlled ride-on vehicles, are known, as are battery powered vehicles. However, standard battery powered and remote-controlled ride-on vehicles have numerous deficiencies and limitations. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

According to one embodiment, the disclosed subject technology relates to a ride-on vehicle that has various drive modes and selective remote-control capabilities.

The disclosed technology further relates to a powered ride-on vehicle comprising: a frame supported by a first drive wheel, a second drive wheel and at least one non-driven support wheel; a first motor connected to the first drive wheel; a second motor connected to the second drive wheel; a steering wheel supported by the frame, the steering wheel having a go selector and a spin selector; a sensor operably connected to the steering wheel to obtain an output of the angular location of the steering wheel; and, a controller operably electrically connected to the first and second motors, the go selector, the spin selector, and the steering wheel sensor, wherein engaging the go selector and turning the steering wheel causes the vehicle to move forward, left or right, depending on the angular location of the steering wheel, and wherein engaging the spin selector and turning the steering wheel causes the vehicle to spin left or spin right, depending on the angular location of the steering wheel.

The disclosed technology further relates to a powered ride-on vehicle further comprising: a parent override switch on the vehicle and electrically connected to the controller; a wireless receiver electrically connected to the controller; and, a remote control having an input member and a wireless transmitter for sending signals to the controller of the vehicle, wherein the controller provides for three modes of operation of the ride-on vehicle, including a child only drive mode, a partial child and partial remote drive mode, and a full remote drive mode, and wherein the controller switches between the three modes of operation in real time based on signals received from the remote control and a position of the parent override switch.

The disclosed technology further relates to a powered ride-on vehicle comprising: a frame supported by a pair of drive wheels and at least one support wheel; one or more motors connected to the drive wheels, the motors operating in the forward and reverse directions; a steering wheel supported by the frame; a go selector; a spin selector; and, a controller operably electrically connected to the one or more motors, the go selector, the spin selector, and the steering wheel, wherein engaging the go selector and turning the steering wheel causes the vehicle to move forward, left or right, depending on the angular location of the steering wheel, and wherein engaging the spin selector and turning the steering wheel causes the vehicle to spin left or spin right, depending on the angular location of the steering wheel.

The disclosed technology further relates to a powered ride-on vehicle comprising: a frame supported by a pair of drive wheels and at least one support wheel; one or more motors connected to the drive wheels, the motors operating in the forward and reverse directions; a steering wheel supported by the frame; a go selector; a spin selector; a controller operably electrically connected to the one or more motors, the go selector, the spin selector, and the steering wheel, wherein engaging the go selector and turning the steering wheel causes the vehicle to move forward, left or right, depending on the angular location of the steering wheel, and wherein engaging the spin selector and turning the steering wheel causes the vehicle to spin left or spin right, depending on the angular location of the steering wheel; a wireless receiver electrically connected to the controller; and, a remote control having an input member and a wireless transmitter for sending signals to the controller of the vehicle, wherein the controller provides for three modes of operation of the ride-on vehicle, including a child only drive mode, a partial child and partial remote drive mode, and a full remote drive mode, and wherein the controller switches between the three modes of operation in real time based on signals received from the remote control.

The disclosed technology further relates to a powered ride-on vehicle wherein there are three zones of the angular location of the steering wheel: forward, left turn and right turn. According to another embodiment, the left turn zone further comprises two zones, a gentle left turn zone and a full left turn zone, and wherein the right turn zone further comprises two zones, a gentle right turn zone and a full right turn zone.

The disclosed technology further relates to a powered ride-on vehicle wherein the controller adjusts the speed of the motors based on the angular location of the steering wheel. According to another embodiment, the controller adjusts the speed of the motors based on the signal received from the sensor coupled to the steering wheel.

The disclosed technology further relates to a powered ride-on vehicle wherein when the go selector is engaged and the steering wheel is in the left turn zone, power to the first drive wheel is decreased to have the vehicle turn left, and when the go selector is engaged and the steering wheel is in the right turn zone, power to the second drive wheel is decreased to have the vehicle turn right.

The disclosed technology further relates to a powered ride-on vehicle wherein the support wheels are casters.

The disclosed technology further relates to a powered ride-on vehicle further comprising a sensor coupled to the first motor and a sensor coupled to the second motor, the sensors providing signals to the controller of the speed of the motor. According to one embodiment, the controller adjusts the speed of the motors based on the signals received from the sensors coupled to the motors.

The disclosed technology further relates to a powered ride-on vehicle having an emergency stop button on the remote control, the controller causing the motors to transition to stop when the emergency stop button is depressed. In another embodiment, when the emergency stop button is engaged the one or more motors are transitioned to stop.

The disclosed technology further relates to a powered ride-on vehicle wherein the first and second motors operate in the forward and reverse directions.

The disclosed technology further relates to a powered ride-on vehicle wherein the controller comprises a motor controller connected to the first and second motors, and a microcontroller connected to the motor controller.

The disclosed technology further relates to a powered ride-on vehicle wherein the go selector and the spin selector are connected to the steering wheel.

The disclosed technology further relates to a powered ride-on vehicle further comprising a sensor operably connected to the steering wheel to obtain an output of the angular location of the steering wheel, the sensor electrically connected with the controller.

The disclosed technology further relates to a powered ride-on vehicle having a parent override switch on the vehicle and electrically connected to the controller. In one embodiment, the parent override switch is in an off position the controller operates in child only drive mode, and signals from the remote control do not control operation of the vehicle. In another embodiment, when the vehicle is in the full remote drive mode, movement of the steering wheel does not control movement of the vehicle. In another embodiment, the vehicle will not operate when the parent override switch is in an override setting and when the remote control is off. In another embodiment, the vehicle will not operate when the parent override switch is in an override setting and when the receiver electrically connected to the controller is not receiving a satisfactory signal from the remote control.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

DETAILED DESCRIPTION

While the powered ride-on vehicle discussed herein is susceptible of embodiments in many different forms, there is shown in the drawings, and will herein be described in detail, preferred embodiments with the understanding that the present description is to be considered as an exemplification of the principles of the powered ride-on vehicle and is not intended to limit the broad aspects of the disclosure to the embodiments illustrated.

Figure 1:
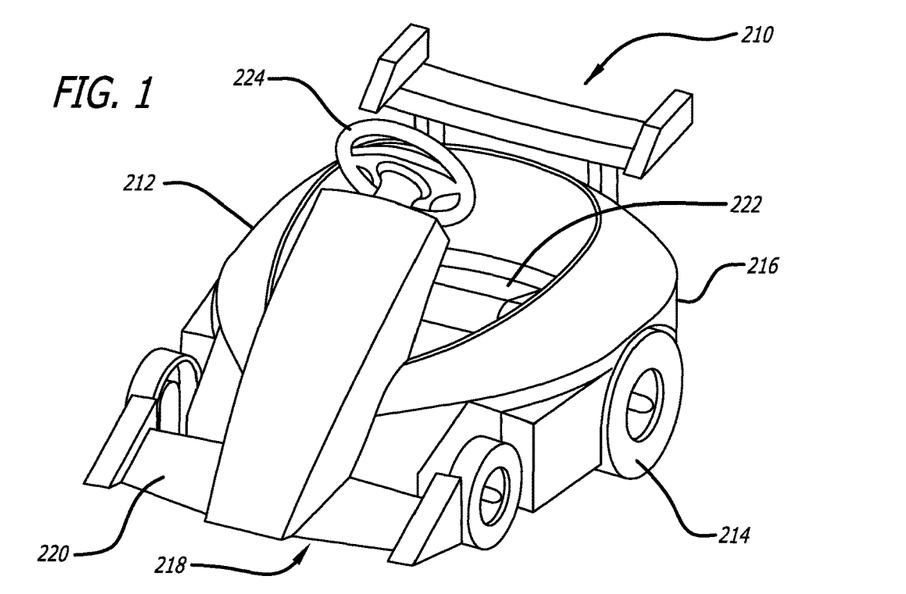
FIG. 1 is a front top perspective view of a dual-controlled battery-powered vehicle according to one embodiment.
Figure 2:
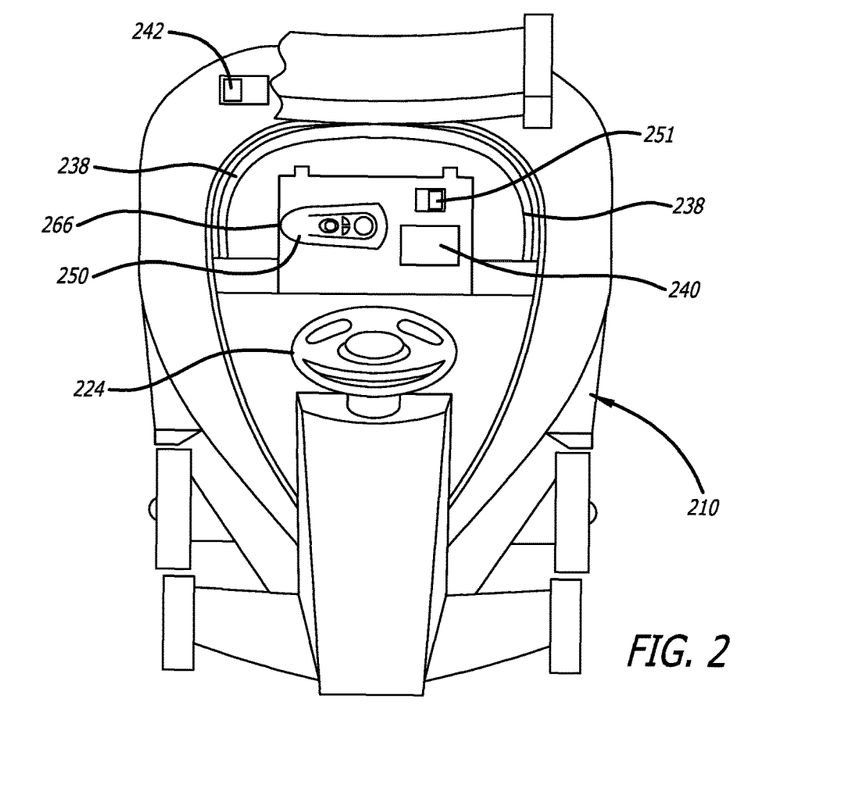
FIG. 2 is a top view of the dual-controlled battery-powered vehicle of FIG. 1, with the seat removed to show the battery and remote controller, and part of the tail removed to show an on/off switch.
Figure 3:
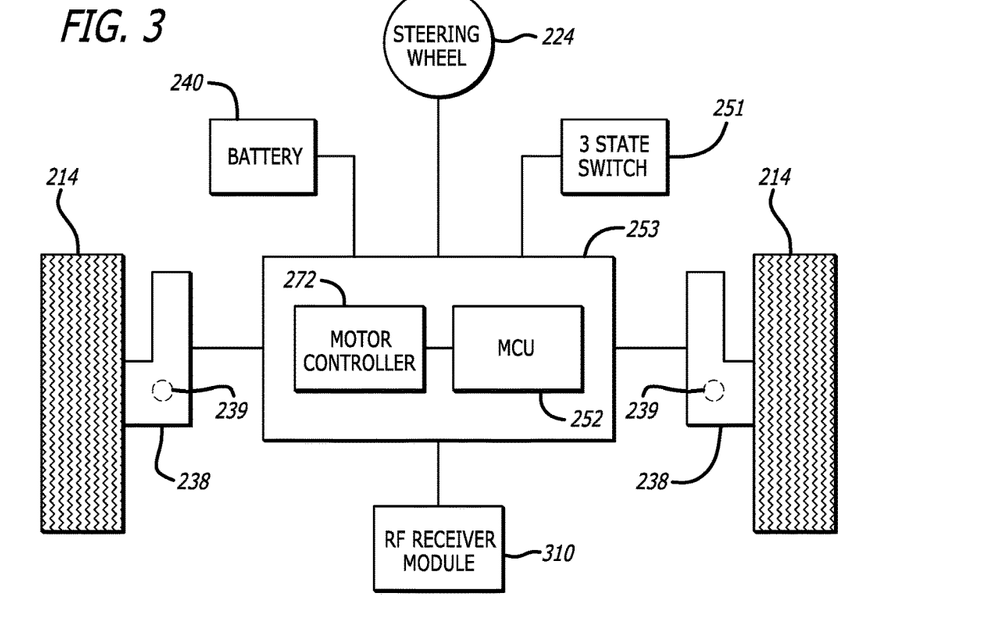
FIG. 3 is a schematic of one drive system of the dual-controlled battery-powered vehicle of FIG. 1.

One embodiment of the powered ride-on vehicle is a ride-on vehicle that is preferably used by children and adolescents, but in alternate embodiments may be used by larger individuals, such as adults. Referring now to FIGS. 1-3, one embodiment of a dual-controlled powered vehicle 210 is shown. The powered vehicle 210 may include a frame 212 supported by a pair of drive wheels 214 and preferably one or more non-drive or follower wheels 218. In one embodiment the drive wheels 214 are provided at the rear portion 216 of the frame 212, and in one embodiment the follower wheels 218 are provided at the forward portion 220 of the frame 212, however, it is understood that the drive wheels 214 may be at the forward portion 220 of the frame 212 and the follower wheels 218 may be provided at the rear portion 216 of the frame 212. It is also understood that in one or more embodiments the follower wheels 218 may preferably be caster-type wheels.

Figure 9:
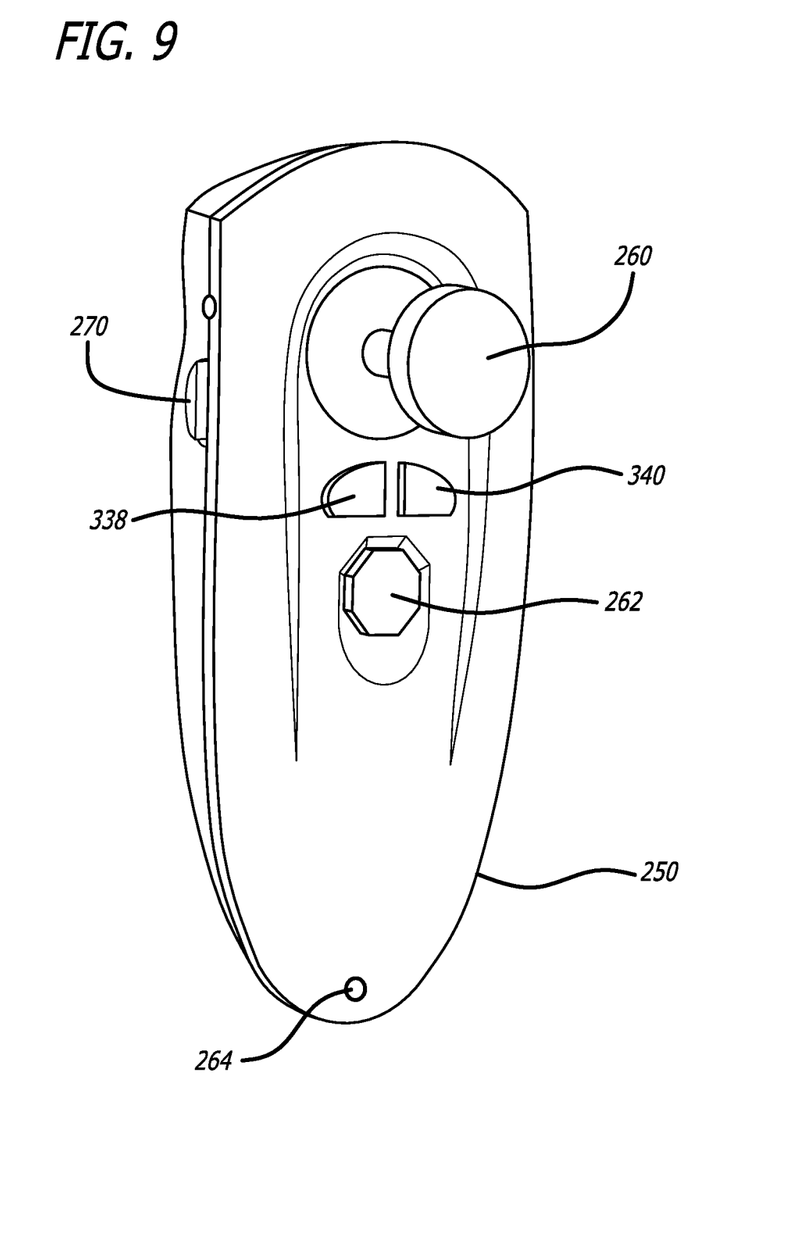
FIG. 9 is an example of one embodiment of a remote control or FOB for a dual-controlled battery-powered vehicle.
Figures 12, 13:
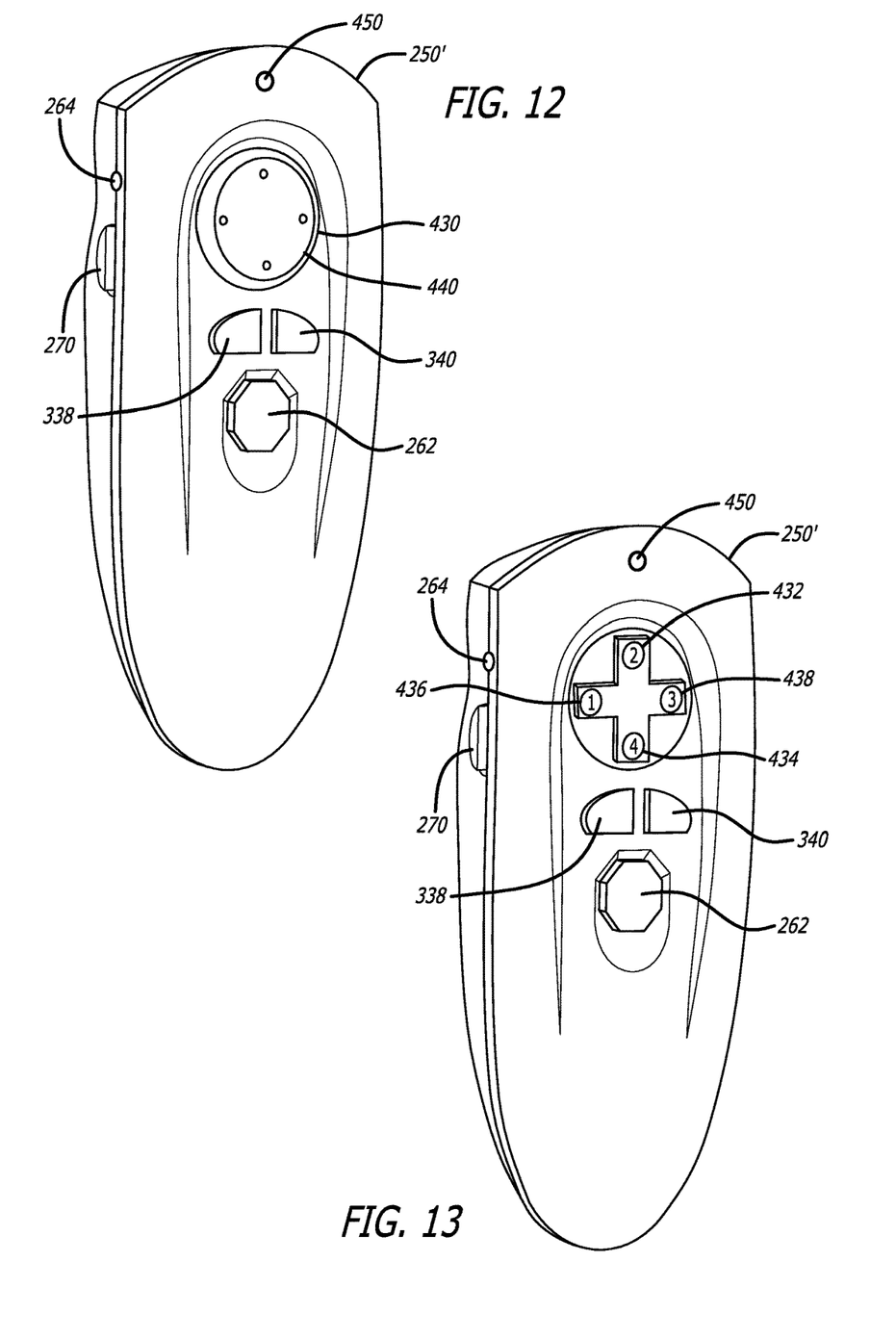
FIG. 12 is an example of another embodiment of a remote control or FOB for a dual-controlled battery-powered vehicle.
FIG. 13 is an example of one embodiment of a layout of a control pad for the remote control FOB of FIG. 12.

The vehicle 210 also preferably includes a seat 222 to support the rider, a steering wheel 224, and one or more motors 238. In a preferred embodiment, two motors 238 are provided. A first motor 238 is provided to independently drive one of the drive wheels 214, and a second motor 238 is provided to independently drive the other of the drive wheels 214. In one embodiment, the drive motors 238 may be connected to the frame 212 and underneath the seat 222. Additionally, since the vehicle is preferably battery powered, a battery 240, which may be a series of rechargeable battery cells, is provided. In one embodiment, the battery is a 6 volt rechargeable battery. The vehicle may also include an on/off switch 242 for the overall vehicle 210. Further, since, as discussed further herein, the vehicle 210 may be controlled remotely in one or more aspects, a remote control device 250, such as a FOB 250 shown in FIG. 9 is also provided. An alternate version of a remote control device 250', also referred to as FOB 250', is shown in FIGS. 12 and 13.

Figure 4:
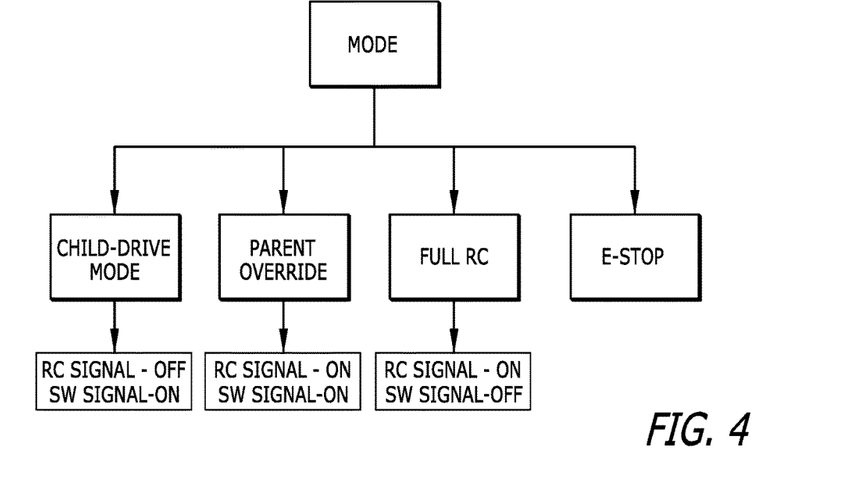
FIG. 4 is a schematic of three different drive modes of the dual-controlled battery-powered vehicle.

In one embodiment, as shown in FIG. 2, the battery 240 and the RC controller 250/250' may be stored under the seat 222 and accessed by pivoting the seat 222 upwardly (in FIG. 2 the seat 222 is removed to show the components under the seat 222). The battery 240 preferably supplies current to the motors 238 to have the motors 238 rotate the drive wheels 214 to drive the vehicle 210. The vehicle 210 also preferably has a main controller 252, such as a microcontroller or MCU 252, and a motor controller 272 to control the motors 238. The main controller 252 and motor controller 272 may be an integrated component 253 in an alternate embodiment and referred to merely as a "controller" 253. Further, the "controller" does not specifically need to be a microcontroller and a motor controller, and may include different and/or additional or fewer electrical components to accomplish the control feature. The As shown in FIG. 4, the dual-controlled battery-powered vehicle 210 can preferably be operated in one of three different modes: (1) full child drive mode; (2) partial child/partial remote drive mode, also referred to as parent override mode; and, (3) full remote drive mode. Additionally an emergency stop mode is also provided for safety purposes. In one embodiment, the vehicle 210 contains a switch 251, shown for example in FIG. 2 under the seat 222, which is utilized to place the vehicle 10 in one of the first three above-listed modes (e.g., full child drive mode; parent override mode; or remote drive mode). In an alternate embodiment, the mode may be changed by the RC controller 250/250'.

Figure 5:
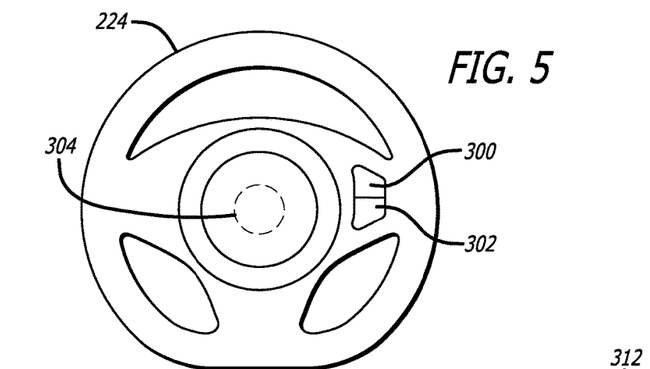
FIG. 5 is an embodiment of a steering wheel for a dual-controlled battery-powered vehicle.
Figure 6:
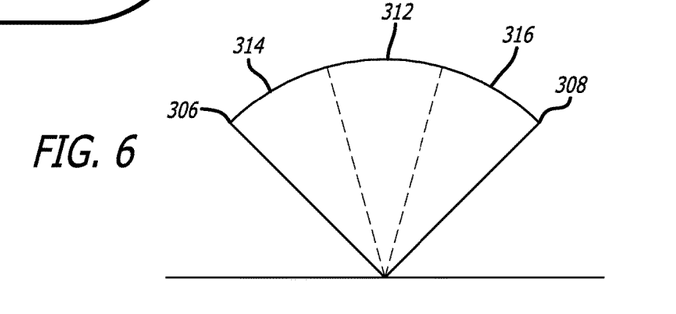
FIG. 6 is a schematic showing the logic for one embodiment of a steering wheel connected to a drive system for a dual-controlled battery-powered vehicle.
Figure 11:
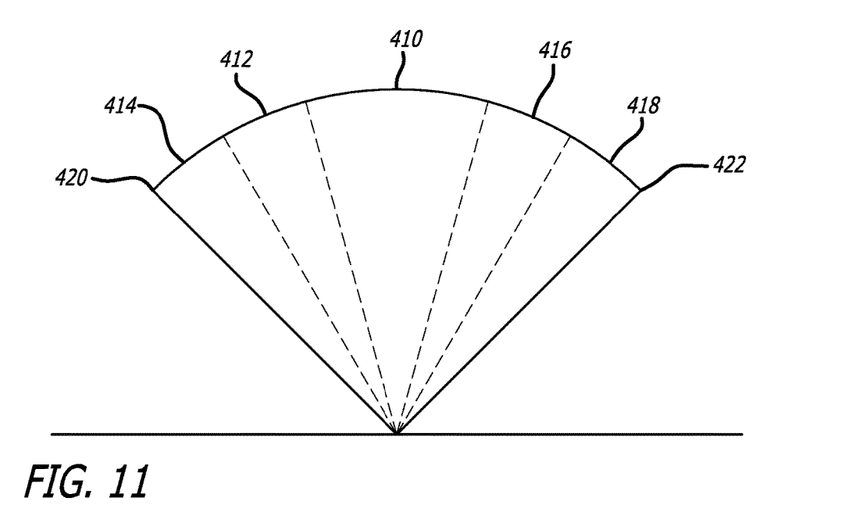
FIG. 11 is a schematic showing the logic for another embodiment of a steering wheel connected to a drive system for a dual-controlled battery-powered vehicle.

Referring to FIGS. 1, 3 and 5, in a preferred embodiment, the vehicle 210 has a steering wheel 224, however, the steering wheel does not control steering of the non-drive or follower wheels 218, rather the steering wheel provides signals (or a sensor associated with the steering wheel provides signals) to the microcontroller 252 to control drive power to the two drive wheels 214 based on the orientation of the steering wheel 224. Additionally, as shown in FIG. 5, in one embodiment the steering wheel 224 has a "go" selector 300, which in one embodiment may be a "go" button 300, a "spin" selector 302, which in one embodiment may be a spin button 302, and a sensor 304, such as an angle sensor or potentiometer, to determine the angle or location of the steering wheel 224 in both orientations from the zero position (shown in FIG. 5). In one embodiment stops are provided for the steering wheel 224 to limit rotation of the steering wheel 224 in both the left turn and right turn orientations. For example, as shown in FIGS. 6 and 11, a left turn stop 306 to limit rotation of the steering wheel 224 to the left from the center, and a right turn stop 308 to limit rotation of the steering wheel 224 to the right from the center. In one embodiment the sensor 304 is a potentiometer or equivalent sensor, such as an encoder, absolute encoder, 3 position switch, 5 position switch, etc. The potentiometer may send an analog signal to the microcontroller 252. In one embodiment the signal range from the potentiometer is from 0-1023, and in another embodiment the signal range from the potentiometer is 0-255. This range of analog signals from the potentiometer corresponds to the full rotation of the steering wheel 224 from the left stop 304 to the right turn stop 306.

In the full child drive mode, exclusive control over the vehicle 210 is allocated to the input from the steering wheel 224. Accordingly, the driver in the vehicle 210 that is controlling the steering wheel 224 has exclusive control over the operations of the vehicle 210. Signals transmitted by the RC controller 250/250' have no effect on the movement or control of the vehicle 210. In one embodiment of the full child drive mode, as well as when the child/driver has control in the parent override mode, and when in the drive/go mode, the microcontroller 252 will provide signals to the motors 238 to only rotate the drive wheels 214 to move the vehicle 210 forward. In this embodiment there is no ability of the driver to reverse the rotation of the drive power to the drive wheels 214 (in the drive/go mode only, not in the spin mode as discussed below). Put another way, the vehicle will only move forward and not in reverse in the full child drive mode as well as when the child has control in the parent override mode. However, as explained below, because the child can operate a spin mode that will essentially turn the vehicle 210 in a zero degree turn radius, no reverse operation may be required.

In the parent override mode, the driver controls movement of the vehicle 210 through the steering wheel 224, unless and until a signal is received by the receiver module 310 on the vehicle 210 from the RC controller 250/250'. Once the receiver module 310 receives a signal from the RC controller 250/250', the person controlling the RC controller 250/250' takes priority and controls the vehicle 210. This allows, for example, the parent to correct the direction of the vehicle even when the child is driving the vehicle. This control may be intermittent, meaning when the RC controller 250/250' is being manipulated, as explained below, the RC controller 250/250' controls the vehicle 210, but as soon as the parent stops manipulating the RC controller 250/250' the child again takes control of the vehicle 201 via the steering wheel 224 control. As explained below, the RC controller 250/250' can send both forward and reverse signals, as well as forward turn left/right, including both full turns and gentle turns in various embodiments, and reverse turn left/right signals, including both full turns and gentle turns in various embodiments, and spin left and spin right signals, to the receiver module 310. And, the motors 238 can therefore operate in reverse rotation in the parent override mode (as well as in the full remote drive mode).

In full remote drive mode all drive control of the vehicle 210 is controlled by the RC controller 250/250'. Manipulation of the steering wheel 224 by the child has no effect on the operation of the vehicle 210, even when the parent is not manipulating the RC controller 250/250' (i.e., even when the RC controller 250/250' is not sending a signal to the receiver module 310). As in the parent override mode, in the full remote drive mode the RC controller 250/250' can send both forward and reverse signals, as well as forward turn left/right and reverse turn left/right signals, including both full turns and gentle turns in various embodiments, and spin left and spin right signals, to the receiver module 310 so that the motors 238 can operate in the forward and reverse rotation in the full remote drive mode.

In the full child drive mode, and in the parent override mode when no signal is being sent from RC controller 250/250', the driver can operate the vehicle 210 in two modes: (i) drive mode and (ii) spin mode. In drive mode the driver holds down the "go" button 300. When the "go" button 300 is depressed the microcontroller 252 sends a signal to the motor controller 272 to have a current provided to the appropriate motors 238 for the drive wheels 214 based on the signal received from the sensor 304 in the steering wheel 224.

Figure 7:
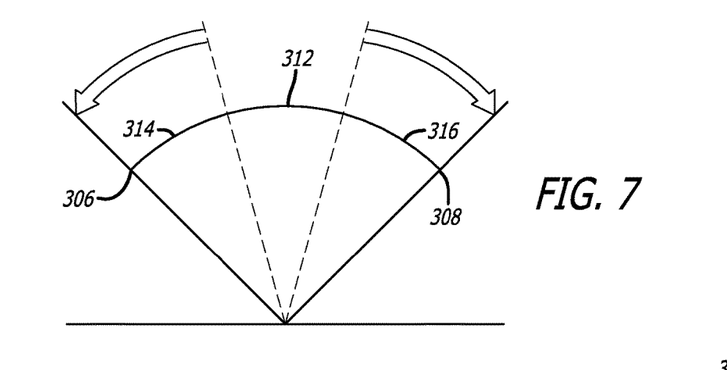
FIG. 7 is a schematic showing the logic for one embodiment of a steering wheel connected to a drive system for a dual-controlled battery-powered vehicle.

As shown in FIGS. 6 and 7, in one embodiment of the "go" mode there are three different steering wheel zones based on the angular orientation of the steering wheel 224: the forward zone 312, the gradient left turn zone 314, and the gradient right turn zone 316. The forward zone 312 preferably includes when the steering wheel is not turned angularly left (i.e., counter clockwise) or angularly right (i.e., clockwise), meaning that it is perfectly straight on the vertical axis, but also when the steering wheel 224 is slightly rotated angularly counter clockwise, such as up to approximately −12.5° from the vertical axis, and when the steering wheel 224 is slightly rotated angularly clockwise, such as up to approximately +12.5° from the vertical axis. Accordingly, in one embodiment the forward zone 312 is approximately 25° in angular width or angular rotation. In one embodiment, the gradient left turn zone 314 preferably starts at −12.5° and ends at the left turn stop 306, which is located at approximately −45° from the vertical axis. Similarly, in one embodiment, the gradient right turn zone 316 preferably starts at +12.5° and ends at the right turn stop 308, which is located at approximately +45° from the vertical axis. It is understood that the specific numbers provided for the angular locations of the different zones are estimates, and may be adjusted in use without departing from the scope of the disclosure.

When the driver has control of the vehicle 210 and when the "go" button 300 is depressed, depending on the orientation of the steering wheel 224, in various embodiments current to the motors 238 may be adjusted to change the power output of each motor 238. For example, as shown in FIG. 7, in one embodiment, when the steering wheel 224 is turned left, to make the vehicle 210 turn left power to the left motor is decreased while the right motor stays fully powered. By maintaining the right motor at full power and decreasing power to the left motor the vehicle 210 will turn left. Further, the more the steering wheel 224 is turned left, less power will be delivered to the left motor, and the more aggressive the left turn will be. Similarly, when the steering wheel 224 is turned right, power to the right motor is decreased while power to the left motor is maintained at full power, thereby causing the vehicle 210 to turn right. Additionally, if the steering wheel 224 is not turned to the left or the right, power will be supplied equally to both rear motors causing the vehicle 210 to drive straight forward.

With reference to FIG. 7, in one embodiment when the "go" selector 300 is engaged and the steering sensor 304 sends a signal to the microcontroller 252 indicating that the angular position of the steering wheel 224 is in the forward zone 312, the microcontroller 252 will have the motor controller 272 fully power both motors 238 equally so that the vehicle 210 will travel straight forward. When the "go" button 300 is depressed and the steering sensor 304 sends a signal that the steering wheel 224 is in the gradient left turn zone 314, the microcontroller 252 will have the motor controller 272 maintain full power to the motor 238 for the right wheel 214, and will have the motor controller 272 adjust the power to the motor 238 linearly for the left wheel 214 from fully powered, at the transition between the forward zone 312 and the gradient left turn zone 314, to fully off, at the left turn stop 306. Accordingly, the more the steering wheel 224 is turned counter clockwise in the gradient left turn zone 314 the sharper the left turning of the vehicle 210. Similarly, when the "go" button 300 is depressed and the steering sensor 304 sends a signal that the steering wheel 224 is in the gradient right turn zone 316, the microcontroller 252 will have the motor controller 272 maintain full power to the motor 238 for the left wheel 214, and will have the motor controller 272 adjust the power to the motor 238 linearly for the right wheel 214 from fully powered, at the transition between the forward zone 312 and the gradient right turn zone 316, to fully off, at the right turn stop 308. Accordingly, the more the steering wheel 224 is turned clockwise in the gradient right turn zone 316 the sharper the right turning of the vehicle 210.

Figure 8:
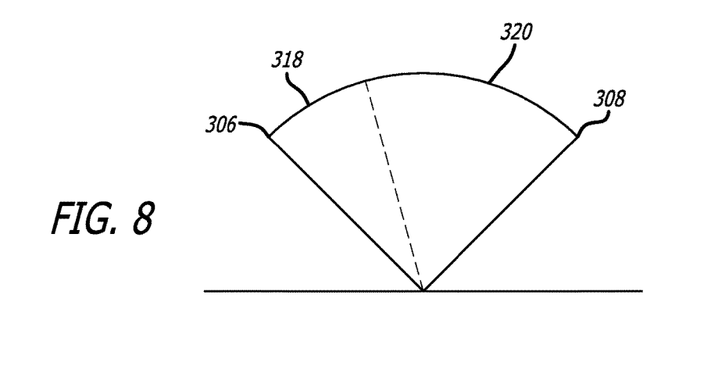
FIG. 8 is a schematic showing the logic for one embodiment of a drive system in spin mode based on input from a steering wheel for a dual-controlled battery-powered vehicle.

The vehicle 210 can also effectuate a 360° spin when the "spin button" 302 is depressed. In spin mode (i.e., when the spin selector 302 is engaged), one motor 238 is fully powered forward (i.e., that motor receives a full forward voltage) while the other motor 238 is fully powered in reverse (i.e., that motor receives a full reverse voltage). This can be done for a left spin or a right spin depending on the direction of the steering wheel 224. As shown in FIG. 8, in the "spin" mode, there are preferably two different steering wheel zones based on the angular orientation of the steering wheel 224: the spin left zone 318 and the spin right zone 320. In one embodiment, one of the spin zones is larger than the other spin zone. In the embodiment shown in FIG. 8, the spin right zone 320 is larger than the spin left zone 318. The same left turn stop 306 and right turn stop 308 are utilized in the spin mode. Accordingly, in one embodiment the spin left zone 318 preferably starts at −12.5° and ends at the left turn stop 306, which is located at approximately −45° from the vertical axis. And, in one embodiment, the right spin zone 320 preferably starts at −12.5° and ends at the right turn stop 308, which is located at approximately +45° from the vertical axis. As explained above, in one embodiment, when the driver has control of the vehicle 210 and when the "go" button 300 is depressed, depending on the orientation of the steering wheel 224, current to the motors 238 may be adjusted to change the power output of each motor 238. Conversely, with reference to FIG. 8, in one embodiment when the "spin" button 302 is depressed and the steering sensor 304 sends a signal to the microcontroller 252 indicating that the angular position of the steering wheel 224 is anywhere in the spin left zone 318, the microcontroller 252 will have the motor controller 272 fully power the left motor 238 in reverse and fully power the right motor 238 in forward (in one embodiment, utilizing a 6V battery, the motor controller will send a max 6V forward signal to the right motor, and a max 6V reverse signal to the left motor). And, when the "spin" button 302 is depressed and the steering sensor 304 sends a signal to the microcontroller 252 indicating that the angular position of the steering wheel 224 is anywhere in the spin right zone 320, the microcontroller 252 will have the motor controller 272 fully power the right motor 238 in reverse and fully power the left motor 238 in forward (in one embodiment, utilizing a 6V battery, the motor controller will send a max 6V reverse signal to the right motor, and a max 6V forward signal to the left motor).

Figure 10:
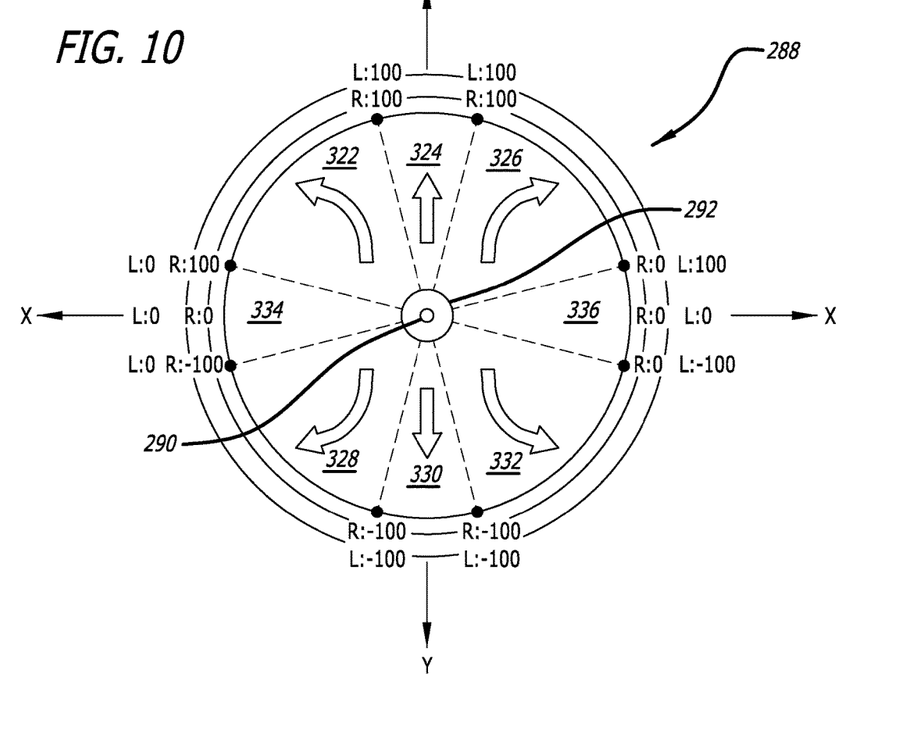
FIG. 10 is a schematic showing the logic for a control of a dual-controlled battery-powered vehicle controlled by a FOB.

In various embodiments, as shown in FIGS. 2, 9 and 10, the dual-controlled battery-powered vehicle 10 may have a RC controller or FOB 250 associated therewith. In one embodiment, the FOB 250 is a device that communicates, preferably wirelessly, with the main controller 252 in the vehicle 210. In a preferred embodiment, the FOB 250 includes both a microcontroller and a transmitter, although in an alternate embodiment the transmitter may be a transceiver to both receive and transmit data to/from the main controller 252 in the vehicle 210 instead of merely sending data to the main controller 252. Similarly, the receiver module 310 in the vehicle 210 preferably is a radio frequency receiver module 310 that receives data from the microcontroller in the FOB 250. Alternately, the receiver module 210 in the vehicle 210 may be a transceiver to transmit and receive data. In different embodiments, the transmitters/receivers transmit and receive data via various wireless technologies, such as radio frequency (i.e., RF), Bluetooth, Wi-Fi, etc. If the vehicle 210 has a transceiver associated therewith, the vehicle 210 may be capable of receiving various items wirelessly such as software updates. The FOB 250 may be a separate device, such as a separate remote controller 250 shown in FIG. 9, or it may be integrated within other electronic devices, such as a smartphone, tablet, PDA, or other computing device. Additionally, a downloadable application may be included to provide FOB functionality to any appropriate electronic device.

Referring to FIG. 9, in one embodiment the FOB 250 contains a joystick 260 that is used to control the turning of the vehicle 210, the speed of the vehicle 210 and the direction (i.e., forward and reverse) of the vehicle 210. While a joystick 260 is described with respect to this embodiment, alternate components of the remote controller 250, including but not limited to a virtual joystick, may provide joystick-like functionality. In a preferred embodiment, the FOB 250 also contains an emergency stop button 262, a battery indicator light 264, and an on/off switch 270. The battery indicator 264 on the FOB 250 is provided to show the battery life of the FOB 250. The vehicle 210 may have a storage receiver 266 for storing the FOB 250, such as under the seat of the vehicle 210.

Referring to FIG. 10, a sample schematic is provided showing a grid 288 that includes various zones or locations on the grid where the joystick 260 can reside or where the joystick 260 may be moved to by the user. In one embodiment, the microcontroller in the FOB 250 senses the X and Y position of the joystick 260, and the microcontroller can send a signal for the X and Y position or location of the joystick 260 to the main controller 252 via the transmitter on the FOB 250 and the receiver module 310 on the vehicle 210.

As shown in FIG. 10, one location of the joystick 260 is the neutral position 290, which is essentially the position [0,0]. The neutral position 290 is generally the center of the joystick grid 288 or home location for the joystick 260, indicating no movement of the joystick 260. Another location for the joystick 260 is the neutral zone 292. The neutral zone 292 is a limited area in both the X and Y directions around the neutral position 290. The neutral zone 292 allows for preventing electronic noise in the system and small inadvertent touches of the joystick from affecting whether the remote controller 250 takes any control of the vehicle 210. When the vehicle is in parent override mode and the joystick 260 is in the neutral zone 292, the vehicle 210 remains in full child drive mode and no override occurs. However, if the vehicle is in parent override mode and the joystick 260 is moved out of the neutral zone 292, the vehicle 210 immediately adjust to be controlled by the FOB 250 and any attempted control by the driver through the steering wheel 224 is ignored by the system. Alternately, if the vehicle 210 is in full RC mode and the joystick 260 is in the neutral zone 292, the vehicle 210 merely remains stopped. As shown in FIG. 9, there is no "go" button on the FOB 250. As soon as the joystick 260 is moved out of the neutral zone 290, when the vehicle 210 is in either of the parent override mode or the full RC mode, the vehicle 210 will convert to being controlled by the FOB 250.

Additional locations on the joystick grid 288 of the joystick 260 are those where the joystick 260 is moved vertically, either up or down, and/or horizontally, either left or right, out of the neutral zone 292, as well as angularly out of the neutral zone 292. In one embodiment there are defined approximately three forward moving zones (forward left zone 322, forward zone 324, forward right zone 326), three reverse moving zones (reverse left zone 328, reverse zone 330, reverse right zone 332), a left turn zone 334, and a right turn zone 336.

The forward zone 324 of the joystick grid 288 is similar to the forward zone 312 of the steering wheel 224. When the joystick 260 is moved in the forward zone 324 of the joystick grid 288, the FOB 250 transmits a signal to the vehicle 210 whereby the motor controller 272 sends a forward voltage signal from zero to maximum voltage, depending on the Y-distance from the neutral zone 292, to both motors 238 equally. Accordingly, in the forward zone 324 the speed may vary, with the speed increasing the further the joystick 260 is away from the neutral zone 292, but the direction is all forward for both motors, meaning that both motors receive the same forward voltage signal.

Similarly, when the joystick 260 is moved in the reverse zone 330 of the joystick grid 288 the FOB 250 transmits a signal to the vehicle 210 whereby the motor controller 272 sends a reverse voltage signal from zero to maximum voltage, depending on the Y-distance from the neutral zone 292, to both motors 238 equally. Accordingly, in the reverse zone 330 the speed may vary, with the speed increasing the further the joystick 260 is away from the neutral zone 292, but the direction is all reverse for both motors, meaning that both motors receive the same reverse voltage signal.

The forward left zone 322 is the zone between the left turn zone 334 and the forward zone 324. When the joystick 260 is in the forward left zone 322, the FOB transmits a signal to the vehicle 210 whereby the motor controller 272 sends a forward signal to the right motor 238 proportional to the negative X-component of the joystick 260 location, and a forward signal to the left motor 238 proportion to the positive Y-component of the joystick 260 location. Accordingly, the further the joystick 260 is to the left of the neutral zone (i.e., the greater the negative X-component is for the location of the joystick 260) the more that the forward speed of the left motor 238 will decrease to effectuate a left turn of the vehicle 210 when the vehicle is moving in the forward direction.

The forward right zone 326 is the zone between the right turn zone 336 and the forward zone 324. When the joystick 260 is in the forward right zone 326, the FOB transmits a signal to the vehicle 210 whereby the motor controller 272 sends a forward signal to the right motor 238 proportional to the positive X-component of the joystick 260 location, and a forward signal to the left motor 238 proportion to the positive Y-component of the joystick 260 location. Accordingly, the further the joystick 260 is to the right of the neutral zone (i.e., the greater the positive X-component is for the location of the joystick 260) the more that the forward speed of the right motor 238 will decrease to effectuate a right turn of the vehicle 210 when the vehicle 210 is moving in the forward direction.

The reverse left zone 328 is the zone between the left turn zone 334 and the reverse zone 330. When the joystick 260 is in the reverse left zone 328, the FOB transmits a signal to the vehicle 210 whereby the motor controller 272 sends a reverse signal (i.e., a switched polarity signal) to the right motor 238 proportional to the negative X-component of the joystick 260 location, and a reverse signal (i.e., a switched polarity signal) to the left motor 238 proportion to the negative Y-component of the joystick 260 location. Accordingly, the further the joystick 260 is to the left of the neutral zone (i.e., the greater the negative X-component is for the location of the joystick 260) the more that the reverse speed of the left motor 238 will decrease to effectuate a left turn of the vehicle 210 when the vehicle is moving in the reverse direction.

The reverse right zone 332 is the zone between the right turn zone 336 and the reverse zone 330. When the joystick 260 is in the reverse right zone 332, the FOB transmits a signal to the vehicle 210 whereby the motor controller 272 sends a reverse signal (i.e., a switched polarity signal) to the left motor 238 proportional to the positive X-component of the joystick 260 location, and a reverse signal (i.e., a switched polarity signal) to the right motor 238 proportion to the negative Y-component of the joystick 260 location. Accordingly, the further the joystick 260 is to the right of the neutral zone (i.e., the greater the positive X-component is for the location of the joystick 260) the more that the reverse speed of the right motor 238 will decrease to effectuate a right turn of the vehicle 210 when the vehicle 210 is moving in the reverse direction.

The left turn zone 334 is the zone between the forward left zone 322 and the reverse left zone 328. As the joystick 260 moves from the forward left zone 322 into the left turn zone 334, the FOB 250 transmits a signal to the vehicle 210 whereby the motor controller 272 sends a smaller forward signal to the right motor 238 proportional to the positive Y-component of the joystick 260 location. This essentially operates to slow the forward motion of the vehicle 210 down to effectuate a smooth transition between the forward motion of the vehicle 210 and the reverse motion of the vehicle 210. Similarly, as the joystick 260 moves from the reverse left zone 328 into the left turn zone 334, the FOB 250 transmits a signal to the vehicle 210 whereby the motor controller 272 sends a smaller reverse signal to the right motor 238 proportional to the negative Y-component of the joystick 260 location. This essentially operates to slow the reverse motion of the vehicle 210 to effectuate a smooth transition between the reverse motion of the vehicle 210 and the forward motion of the vehicle 210.

The right turn zone 336 is the zone between the forward right zone 326 and the reverse right zone 332. As the joystick 260 moves from the forward right zone 326 into the right turn zone 336, the FOB 250 transmits a signal to the vehicle 210 whereby the motor controller 272 sends a smaller forward signal to the left motor 238 proportional to the positive Y-component of the joystick 260 location. This essentially operates to slow the forward motion of the vehicle 210 down to effectuate a smooth transition between the forward motion of the vehicle 210 and the reverse motion of the vehicle 210. Similarly, as the joystick 260 moves from the reverse right zone 332 into the right turn zone 336, the FOB 250 transmits a signal to the vehicle 210 whereby the motor controller 272 sends a smaller reverse signal to the left motor 238 proportional to the negative Y-component of the joystick 260 location. This essentially operates to slow the reverse motion of the vehicle 210 to effectuate a smooth transition between the reverse motion of the vehicle 210 and the forward motion of the vehicle 210.

Additionally, when the joystick 260 is moved directly left from the neutral zone 292 into the left turn zone 334 along the X-axis in the negative X direction, the FOB 250 transmits a signal to the vehicle 210 whereby the motor controller 272 sends a 0 volt signal to the left motor 238 and an increasing voltage signal (starting at 0 volts and increasing to the maximum voltage of the motor) to the right motor 238 based on distance the joystick 260 moves along the X-axis in the negative direction away from the center to effectuate a left turn.

Similarly, when the joystick 260 is moved directly right from the neutral zone 292 into the right turn zone 336 along the X-axis in the positive X direction, the FOB 250 transmits a signal to the vehicle 210 whereby the motor controller 272 sends a 0 volt signal to the right motor 238 and an increasing voltage signal (starting at 0 volts and increasing to the maximum voltage of the motor) to the left motor 238 based on distance the joystick 260 moves along the X-axis in the positive direction away from the center to effectuate a right turn.

The operator of the FOB is also able to effectuate a spin of the vehicle 210. Referring to FIG. 9, the FOB 250 has a left spin button 338 and a right spin button 340. When the vehicle is in parent override mode and the operator depresses either the left spin button 338 or the right spin button 340 the vehicle 210 immediately transitions from child drive mode to parent override mode and the vehicle 210 will immediately be controlled by the FOB 250 and will begin to spin. If the vehicle is in full child mode and the user depresses the left spin button 338 or the right spin button 340, no override occurs. Similarly, if the vehicle 210 is in full RC mode and operator depresses either the left spin button 338 or the right spin button 340 the vehicle 210 immediately begins to spin. As soon as the operator releases the left spin button 338 or the right spin button 340, depending on what was depressed, the vehicle 210 quickly ramps to a stop. When the system transitions from the driver/child control mode to remote control mode, there is preferably a ramp down to 0V for both motors followed by a ramp up to the transmitted signal voltage to avoid any sudden, jerking motion imparted on the driver in the vehicle. This preferably applies whenever sudden changes would occur (e.g., from spin left to spin right, etc.). Additionally, there is preferably either a ramp up or ramp down whenever transitioning from a neutral signal to a large voltage signal (e.g., neutral to spin right or left, etc.) or transitioning from a large voltage signal to neutral (e.g., spin right or spin left to neutral, etc.). Alternately, rather than ramping to a stop (i.e., 0V), the vehicle will ramp to the next provided input signal to avoid a jerking motion of the vehicle.

Spin mode as controlled by the FOB 250 is the same as spin mode effected by the user of the vehicle 210 through use of the spin button 302 and turning the steering wheel 224. When the left spin button 338 of the FOB 250 is depressed a signal is sent from the FOB 250 via the FOB transmitter module to the vehicle receiver module 310 and then to the microcontroller 252 of the vehicle 210 to have the motor controller 272 fully power the left motor 238 in reverse and fully power the right motor 238 in forward (in one embodiment, utilizing a 6V battery, the motor controller will send a max 6V forward signal to the right motor, and a max 6V reverse signal to the left motor). And, when the right spin button 340 is depressed a signal is sent from the FOB 250 via the FOB transmitter module to the vehicle receiver module 310 and then to the microcontroller 252 of the vehicle 210 to have the motor controller 272 fully power the right motor 238 in reverse and fully power the left motor 238 in forward (in one embodiment, utilizing a 6V battery, the motor controller will send a max 6V reverse signal to the right motor, and a max 6V forward signal to the left motor).

As shown in FIG. 9, the FOB 250 also has an emergency stop button 262. If the vehicle 210 is in either Full RC mode or Parent Override mode, and the emergency stop button 262 is depressed, both motors 238 (i.e., the left motor and the right motor) will receive a neutral 0 volt signal preventing the vehicle 210 from moving if stopped, or bringing the vehicle 210 to a very quick stop if it was previously in motion. The emergency stop signal is prioritized over all other signals received from the RC controller 250 or the steering wheel 224. In other embodiments, the emergency stop button might be latching or a simulated latch with a momentary button such that emergency stop mode is constant after one push and released by a second push.

In parent override mode, prior to allowing for movement of the vehicle 210, the microcontroller 252 determines the value for the location of the joystick 260 and the position of the emergency stop button 262 (i.e., whether it has been depressed or not). If the emergency stop button 62 has not been activated and the value for the joystick 260 location is within the neutral position 290 or neutral zone 292, the microcontroller 252 will allow for full child drive mode, meaning the child will have control of the operation of the vehicle 210.

In the parent override mode, when the joystick 260 is in the neutral zone 292 the driver in the vehicle 210 will have full control of the vehicle 210. If the microcontroller 252 receives a value from the microcontroller on the FOB 250 that the joystick 260 has moved out of the neutral zone 292 into any other zone, and if the emergency stop button 262 has not been activated, the microcontroller 252 transitions the control system of the vehicle 210 to being controlled by the FOB 250.

Alternate embodiments of the control logic for the drive of the vehicle 210 are also provided herein. Referring to FIG. 11, in one alternate embodiment there are five different steering wheel zones for the "go" mode based on the angular orientation of the steering wheel 224: (1) the forward or straight zone 410, (2) the gentle left turn zone 412, (3) the full left turn zone 414, (4) the gentle right turn zone 416, and (5) the full right turn zone 418. The forward or straight zone 410 preferably includes when the steering wheel is not turned angularly left (i.e., counter clockwise) or angularly right (i.e., clockwise), meaning that it is perfectly straight on the vertical axis, but it also includes when the steering wheel 224 is slightly rotated angularly counter clockwise, such as up to approximately −10° from the vertical axis, and when the steering wheel 224 is slightly rotated angularly clockwise, such as up to approximately +13° from the vertical axis. Accordingly, in one embodiment the forward zone 410 is approximately 20° in angular width. In one embodiment, the gentle left turn zone 412 preferably starts at −10° and ends at the beginning of the full left turn zone 414, which is located approximately at −10°. And, in one embodiment the full left turn zone 414 preferably starts at −25° and ends at the left turn stop 420, which is located at approximately −45° from the vertical axis. Similarly, in one embodiment, the gentle right turn zone 416 preferably starts at 10° and ends at the beginning of the full right turn zone 418, which is located approximately at 25°. And, in one embodiment the full right turn zone 418 preferably starts at 25° and ends at the right turn stop 422, which is located at approximately 45° from the vertical axis. It is understood that the specific numbers provided for the angular locations/stops of the different zones are examples only, and may be adjusted in use without departing from the scope of the disclosure.

When the driver has control of the vehicle 210 and when the "go" selector 300 is depressed, depending on the orientation of the steering wheel 224, in various embodiments current to the motors 238 may be adjusted to change the power output of each motor 238. For example, as shown in FIG. 11, in one embodiment, when the steering wheel 224 is turned left to make the vehicle 210 turn left, power to the left motor is decreased or eliminated, depending on how far the steering wheel is turned to the left, while the right motor stays fully powered. By maintaining the right motor at full power and decreasing or eliminating power to the left motor the vehicle 210 will turn left at various rates. Similarly, when the steering wheel 224 is turned right, power to the right motor is decreased or eliminated, depending on how far the steering wheel 224 is turned to the right, while power to the left motor is maintained at full power, thereby causing the vehicle 210 to turn right at various rates. Additionally, if the steering wheel 224 is not turned too far to the left or the right (i.e., it is maintained in the forward or straight zone 410), power will generally be supplied equally to both rear motors, as explained herein, causing the vehicle 210 to drive straight forward.

With reference to FIG. 11, in one embodiment when the "go" selector 300 is depressed and the steering sensor 304 sends a signal to the microcontroller 252 indicating that the angular position of the steering wheel 224 is in the forward or straight zone 410, the microcontroller 252 will have the motor controller 272 fully power both motors 238 preferably equally so that the vehicle 210 will travel straight forward. However, in one embodiment, a sensor 239, such as a Hall Effect sensor, encoder (optical, mechanical, etc.), provides a signal to the microcontroller 252 of the speed of each motor, such as the revolutions per minute of the output shaft or output gear of the motors. Alternately, an electric compass, such as a magnetometer or other directional device, such as a GPS system, may provide a signal of the direction of the vehicle to determine if the vehicle is moving straight or is veering to one side. The signal from the sensor 239 will be received and processed by the microcontroller 252, such as processing through an algorithm in the microcontroller 252, to determine the appropriate power to provide to each motor so that each motor output shaft rotates similarly to the other motor output shaft regardless of differences in each motor, weight distribution in the vehicle, etc.

When the "go" selector 300 is engaged, which may include being depressed in one embodiment, and the steering sensor 304 sends a signal that the steering wheel 224 is in the gentle left turn zone 412, the microcontroller 252 will have the motor controller 272 maintain full power to the motor 238 for the right wheel 214, and will have the motor controller 272 reduce the power to the motor 238 for the left wheel 214 from fully powered to some power less than full power. When the "go" selector 300 is depressed and the steering sensor 304 sends a signal that the steering wheel 224 is in the full left turn zone 414, the microcontroller 252 will have the motor controller 272 maintain full power to the motor 238 for the right wheel 214, and will have the motor controller 272 send no power or zero voltage to the motor 238 for the left wheel 214. Similarly, when the "go" selector 300 is depressed and the steering sensor 304 sends a signal that the steering wheel 224 is in the gentle right turn zone 416, the microcontroller 252 will have the motor controller 272 maintain full power to the motor 238 for the left wheel 214, and will have the motor controller 272 reduce the power to the motor 238 for the right wheel 214 from fully powered to some power less than full power. When the "go" selector 300 is depressed and the steering sensor 304 sends a signal that the steering wheel 224 is in the full right turn zone 418, the microcontroller 252 will have the motor controller 272 maintain full power to the motor 238 for the left wheel 214, and will have the motor controller 272 send no power or zero voltage to the motor 238 for the right wheel 214. Accordingly, the more the steering wheel 224 is turned counter clockwise left the sharper the left turning of the vehicle 210, and the more the steering wheel 224 is turned clockwise right the sharper the right turning of the vehicle 210.

The vehicle 210 can also effectuate a 360° spin when the "spin" selector is engaged, which similarly may include being depressed in one embodiment. As explained above, in spin mode, one motor 238 is fully powered forward (i.e., that motor receives a full forward voltage) while the other motor 238 is fully powered in reverse (i.e., that motor receives a full reverse voltage). This can be done for a left spin or a right spin depending on the direction of the steering wheel 224. FIG. 8 provides one embodiment of the logic for spinning the vehicle 210 based on the angular orientation of the steering wheel 224 when the spin button is depressed.

In one embodiment, as shown in FIGS. 2, 12 and 13, the dual-controlled battery-powered vehicle 10 may have a RC controller or FOB 250' associated therewith. In one embodiment, the FOB 250' is a device that communicates, preferably wirelessly, with the main controller 252 in the vehicle 210. In a preferred embodiment, the FOB 250' includes both a microcontroller and a transmitter, although in an alternate embodiment the transmitter may be a transceiver to both receive and transmit data to/from the main controller 252 in the vehicle 210 instead of merely sending data to the main controller 252. Similarly, the receiver module 310 in the vehicle 210 preferably is a radio frequency receiver module 310 that receives data from the microcontroller in the FOB 250'. Alternately, the receiver module 210 in the vehicle 210 may be a transceiver to transmit and receive data. In different embodiments, the transmitters/receivers transmit and receive data via various wireless technologies, such as radio frequency (i.e., RF), Bluetooth, Wi-Fi, etc. If the vehicle 210 has a transceiver associated therewith, the vehicle 210 may be capable of receiving various items wirelessly such as software updates. The FOB 250' may be a separate device, such as a separate remote controller 250' shown in FIG. 12, or it may be integrated within other electronic devices, such as a smartphone, tablet, PDA, or other computing device. Additionally, a downloadable application may be included to provide FOB functionality to any appropriate electronic device.

Referring to FIGS. 12-13, in one embodiment the FOB 250' contains a control pad 430 with several discrete directional inputs. In one embodiment, the control pad 430 is a four-way directional control pad 430, such as a D-pad, with one button on each point at the north (up) 432, south (down) 434, west (left) 436 and east (right) 438 directions. While the control pad 430 can accept inputs at individual buttons, the control pad 430 can also accept inputs of combinations of two directions, for example up 432 and left 436. To assist in allowing input of combinations of directions, a cover 440 is maintained on the control pad 430 as shown in FIG. 12. Different inputs to the control pad 430 are used to control the turning of the vehicle 210, the speed of the vehicle 210 and the direction (i.e., forward and reverse) of the vehicle 210. While a control pad 430 is described with respect to this embodiment, alternate components of the remote controller may be utilized.

In a preferred embodiment, the FOB 250' also contains an emergency stop button 262, a battery indicator light 264, an on/off switch 270, and a signal indicator light 450. The battery indicator 264 on the FOB 250' is provided to show the battery life of the FOB 250'. In one embodiment, when the FOB 250' is powered one with the power switch 270, the battery indicator light 264 will illuminate and remain lit to indicate that the FOB 250' is on. In one embodiment, when the batteries powering the FOB 250' drop below a defined voltage, the battery indicator light 264 will blink, indicating that the voltage is low. In one embodiment, signal indicator light 450 is used to communicate messages to the user related to the FOB 250' signal. For example, in one embodiment when a button on the FOB 250' is depressed, the signal indicator light 450 will illuminate to indicate that the signal is being sent to the vehicle 210. Additionally, the signal indicator light 450 is used during the pairing process to pair the FOB 250' with the vehicle 210. To pair the FOB 250', the vehicle 210 should be set to a pairing mode and a combination of buttons on the FOB 250' will typically be held for a defined duration. When the FOB 250' is pairing to the vehicle 210, the signal indicator light 450 will blink on and off, and then when the FOB 250' is paired to the vehicle 210, the signal indicator light 450 will remain solid for a defined duration before turning off to indicate that the FOB 250' has successfully been paired to the vehicle 210. The vehicle 210 may have a storage receiver 266 for storing the FOB 250', such as under the seat of the vehicle 210.

In use of the FOB 250', by depressing different buttons or different combinations of buttons, the vehicle 210 will be controlled differently. For example, different movements may be conducted via the FOB 250' as described below. In one embodiment, the microcontroller in the FOB 250' senses the depressing of the various buttons of the control pad 430 under the cover 440, and the microcontroller can send an appropriate signal to the main controller 252 via the transmitter on the FOB 250' and the receiver module 310 on the vehicle 210.

Straight Forward Movement: If the up button 432 is depressed, such as by pushing the top portion of the cover 440, the motor controller 272 will maintain full power to the motor 238 for the left wheel 214, and full power to the motor 238 for the right wheel 214 so that the vehicle 210 will move straight ahead.

Gentle Right Turn Forward: If the up button 432 and right button 438 are both depressed, such as by pushing on the upper right quadrant of the cover 440, the motor controller 272 will maintain full power to the motor 238 for the left wheel 214, and reduced power, such as 50% power, to the motor 238 for the right wheel 214 to effectuate a gentle right turn forward.

Gentle Left Turn Forward: If the up button 432 and left button 436 are both depressed, such as by pushing on the upper left quadrant of the cover 440, the motor controller 272 will maintain full power to the motor 238 for the right wheel 214, and reduced power, such as 50% power, to the motor 238 for the left wheel 214 to effectuate a gentle left turn forward.

Full Right Turn: If the right button 438 is depressed, such as by pushing the right portion of the cover 440, the motor controller 272 will maintain full power to the motor 238 for the left wheel 214 and will provide zero power to the motor 238 for the right wheel 214 so that the vehicle 210 will make a full right turn.

Full Left Turn: If the left button 436 is depressed, such as by pushing the left portion of the cover 440, the motor controller 272 will maintain full power to the motor 238 for the right wheel 214 and will provide zero power to the motor 238 for the left wheel 214 so that the vehicle 210 will make a full left turn.

Straight Reverse Movement: If the down button 434 is depressed, such as by pushing the bottom portion of the cover 440, the motor controller 272 will maintain full reverse power to the motor 238 for the left wheel 214, and full reverse power to the motor 238 for the right wheel 214 so that the vehicle 210 will move straight in reverse.

Gentle Right Turn Reverse: If the down button 434 and right button 438 are both depressed, such as by pushing on the lower right quadrant of the cover 440, the motor controller 272 will maintain full reverse power to the motor 238 for the left wheel 214, and reduced reverse power, such as 50% power, to the motor 238 for the right wheel 214 to effectuate a gentle right turn in reverse.

Gentle Left Turn Reverse: If the down button 434 and left button 436 are both depressed, such as by pushing on the lower left quadrant of the cover 440, the motor controller 272 will maintain full reverse power to the motor 238 for the right wheel 214, and reduced reverse power, such as 50% power, to the motor 238 for the left wheel 214 to effectuate a gentle left turn in reverse.

In an alternate embodiment, whenever the down button 434 of the FIG. 250' is depressed the vehicle will move in the straight reverse mode. Accordingly, no gentle right turn reverse and no gentle left turn reverse may be provided.

When the vehicle is in parent override mode and none of the buttons of the control pad 430 are depressed, the vehicle 210 remains in full child drive mode and no override occurs. However, if the vehicle is in parent override mode and the control pad 430 is engaged, the vehicle 210 immediately adjusts to be controlled by the FOB 250' and any attempted control by the driver through the steering wheel 224 is ignored by the system. Alternately, if the vehicle 210 is in full RC mode and the control pad 430 is not engaged the vehicle 210 merely remains stopped. As shown in FIG. 12, there is no "go" button on the FOB 250'. As soon as the control pad 430 is engaged, when the vehicle 210 is in either of the parent override mode or the full RC mode, the vehicle 210 will convert to being controlled by the FOB 250'.

The operator of the FOB is also able to effectuate a spin of the vehicle 210. Referring to FIG. 12, the FOB 250' has a left spin button 338 and a right spin button 340. When the vehicle is in parent override mode and the operator depresses either the left spin button 338 or the right spin button 340, the vehicle 210 immediately transitions from child drive mode to parent override mode and the vehicle 210 will immediately be controlled by the FOB 250' and will begin to spin. If the vehicle is in full child mode and the user depresses the left spin button 338 or the right spin button 340, no override occurs. Similarly, if the vehicle 210 is in full RC mode and operator depresses either the left spin button 338 or the right spin button 340, the vehicle 210 immediately begins to spin. As soon as the operator releases the left spin button 338 or the right spin button 340, depending on what was depressed, the vehicle 210 quickly ramps to a stop. When the system transitions from the driver/child control mode to remote control mode, there is preferably a ramp down to 0V for both motors followed by a ramp up to the transmitted signal voltage to avoid any sudden, jerking motion imparted on the driver in the vehicle. This preferably applies whenever sudden changes would occur (e.g., from spin left to spin right, etc.). Additionally, there is preferably either a ramp up or ramp down whenever transitioning from a neutral signal to a large voltage signal (e.g., neutral to spin right or left, etc.) or transitioning from a large voltage signal to neutral (e.g., spin right or spin left to neutral, etc.). Alternately, rather than ramping to a stop (i.e., 0V), the vehicle will ramp to the next provided input signal to avoid a jerking motion of the vehicle.

Spin mode as controlled by the FOB 250' is the same as spin mode effected by the user of the vehicle 210 through use of the spin button 302 and turning the steering wheel 224

As shown in FIG. 12, the FOB 250 also has an emergency stop button 262. If the vehicle 210 is in either Full RC mode or Parent Override mode, and the emergency stop button 262 is depressed, both motors 238 (i.e., the left motor and the right motor) will receive a neutral 0 volt signal preventing the vehicle 210 from moving if stopped, or bringing the vehicle 210 to a very quick stop if it was previously in motion. The emergency stop signal is prioritized over all other signals received from the RC controller 250' or the steering wheel 224. In other embodiments, the emergency stop button might be latching or a simulated latch with a momentary button such that emergency stop mode is constant after one push and released by a second push.

In parent override mode, prior to allowing for movement of the vehicle 210, the microcontroller 252 determines whether the control pad 430 is being depressed and the position of the emergency stop button 262 (i.e., whether it has been depressed or not). If the emergency stop button 262 has not been activated and the control pad 430 is not manipulated, the microcontroller 252 will allow for full child drive mode, meaning the child will have control of the operation of the vehicle 210.

In the parent override mode, when the control pad 430 is not manipulated the driver in the vehicle 210 will have full control of the vehicle 210. If the microcontroller 252 receives a value from the microcontroller on the FOB 250' that the control pad 430 is manipulated, and if the emergency stop button 262 has not been activated, the microcontroller 252 transitions the control system of the vehicle 210 to being controlled by the FOB 250'.

While specific embodiments have been illustrated and described, numerous modifications come to mind without significantly departing from the spirit of the disclosure, and the scope of protection is only limited by the scope of the accompanying claims.

What is claimed is:

1. A powered ride-on vehicle comprising:
   a frame supported by a first drive wheel, a second drive wheel and at least one non-driven support wheel;
   a first motor connected to the first drive wheel;
   a second motor connected to the second drive wheel;
   a steering wheel supported by the frame, the steering wheel having a go selector and a spin selector;
   a sensor operably connected to the steering wheel to obtain an output of the angular location of the steering wheel; and,
   a controller operably electrically connected to the first and second motors, the go selector, the spin selector, and the steering wheel sensor, wherein engaging the go selector and turning the steering wheel causes the vehicle to move forward, left or right, depending on the angular location of the steering wheel, and wherein engaging the spin selector and turning the steering wheel causes the vehicle to spin left or spin right, depending on the angular location of the steering wheel.

2. The powered ride-on vehicle of claim 1, wherein there are three zones of the angular location of the steering wheel: forward, left turn and right turn.

3. The powered ride-on vehicle of claim 2, wherein the controller adjusts the speed of the motors based on the angular location of the steering wheel.

4. The powered ride-on vehicle of claim 2, wherein the controller adjusts the speed of the motors based on the signal received from the sensor coupled to the steering wheel.

5. The powered ride-on vehicle of claim 2, wherein the left turn zone further comprises two zones, a gentle left turn zone and a full left turn zone, and wherein the right turn zone further comprises two zones, a gentle right turn zone and a full right turn zone.

6. The powered ride-on vehicle of claim 1, wherein the support wheels are casters.

7. The powered ride-on vehicle of claim 2, wherein when the go selector is engaged and the steering wheel is in the left turn zone, power to the first drive wheel is decreased to have the vehicle turn left, and when the go selector is engaged and the steering wheel is in the right turn zone, power to the second drive wheel is decreased to have the vehicle turn right.

8. The powered ride-on vehicle of claim 1, further comprising a sensor coupled to the first motor and a sensor coupled to the second motor, the sensors providing signals to the controller of the speed of the motor.

9. The powered ride-on vehicle of claim 8, wherein the controller adjusts the speed of the motors based on the signals received from the sensors coupled to the motors.

10. The powered ride-on vehicle of claim 1, further comprising:
a parent override switch on the vehicle and electrically connected to the controller;
a wireless receiver electrically connected to the controller; and,
a remote control having an input member and a wireless transmitter for sending signals to the controller of the vehicle, wherein the controller provides for three modes of operation of the ride-on vehicle, including a child only drive mode, a partial child and partial remote drive mode, and a full remote drive mode, and wherein the controller switches between the three modes of operation in real time based on signals received from the remote control and a position of the parent override switch.

11. The powered ride-on vehicle of claim 10, further comprising an emergency stop button on the remote control, the controller causing the motors to transition to stop when the emergency stop button is depressed.

12. The powered ride-on vehicle of claim 1, wherein the first and second motors operate in the forward and reverse directions.

13. The powered ride-on vehicle of claim 1, wherein the controller comprises a motor controller connected to the first and second motors, and a microcontroller connected to the motor controller.

14. The powered ride-on vehicle of claim 1, wherein the go selector and the spin selector are connected to the steering wheel.

15. A powered ride-on vehicle comprising:
a frame supported by a pair of drive wheels and at least one support wheel;
one or more motors connected to the drive wheels, the motors operating in the forward and reverse directions;
a steering wheel supported by the frame;
a go selector;
a spin selector; and,
a controller operably electrically connected to the one or more motors, the go selector, the spin selector, and the steering wheel, wherein engaging the go selector and turning the steering wheel causes the vehicle to move forward, left or right, depending on the angular location of the steering wheel, and wherein engaging the spin selector and turning the steering wheel causes the vehicle to spin left or spin right, depending on the angular location of the steering wheel, by operating the pair of drive wheels in opposing directions.

16. The powered ride-on vehicle of claim 15, further comprising a sensor operably connected to the steering wheel to obtain an output of the angular location of the steering wheel, the sensor electrically connected with the controller.

17. The powered ride-on vehicle 15, further comprising:
a wireless receiver electrically connected to the controller; and,
a remote control having an input member and a wireless transmitter for sending signals to the controller of the vehicle, wherein the controller provides for three modes of operation of the ride-on vehicle, including a child only drive mode, a partial child and partial remote drive mode, and a full remote drive mode, and wherein the controller switches between the three modes of operation in real time based on signals received from the remote control.

18. The powered ride-on vehicle of claim 17, further comprising a parent override switch on the vehicle and electrically connected to the controller.

19. The powered ride-on vehicle of claim 18, wherein when the parent override switch is in an off position the controller operates in child only drive mode, and signals from the remote control do not control operation of the vehicle.

20. The powered ride-on vehicle of claim 18, wherein when the vehicle is in the full remote drive mode, movement of the steering wheel does not control movement of the vehicle.

21. The powered ride-on vehicle of claim 18, wherein the vehicle will not operate when the parent override switch is in an override setting and when the remote control is off.

22. The powered ride-on vehicle of claim 18, wherein the vehicle will not operate when the parent override switch is in an override setting and when the receiver electrically connected to the controller is not receiving a satisfactory signal from the remote control.

23. A powered ride-on vehicle comprising:
a frame supported by a pair of drive wheels and at least one support wheel;
one or more motors connected to the drive wheels, the motors operating in the forward and reverse directions;
a steering wheel supported by the frame;
a go selector;
a spin selector;
a controller operably electrically connected to the one or more motors, the go selector, the spin selector, and the steering wheel, wherein engaging the go selector and turning the steering wheel causes the vehicle to move forward, left or right, depending on the angular location of the steering wheel, and wherein engaging the spin selector and turning the steering wheel causes the vehicle to spin left or spin right, depending on the angular location of the steering wheel;
a wireless receiver electrically connected to the controller; and,
a remote control having an input member and a wireless transmitter for sending signals to the controller of the vehicle, wherein the controller provides for three modes of operation of the ride-on vehicle, including a child only drive mode, a partial child and partial remote drive mode, and a full remote drive mode, wherein the controller switches between the three modes of operation in real time based on signals received from the remote control, and wherein the controller operates the vehicle to move forward, move left, or move right in the partial remote drive mode and the full remote drive mode.

24. The powered ride-on vehicle of claim 23, further comprising a sensor operably connected to the steering wheel to obtain an output of the angular location of the steering wheel, the sensor electrically connected with the controller.

25. The powered ride-on vehicle of claim 23, wherein the remote control further has an emergency stop button, and wherein when the emergency stop button is engaged the one or more motors are transitioned to stop.

\* \* \* \* \*